(12) United States Patent
Burton

(10) Patent No.: US 7,906,101 B2
(45) Date of Patent: Mar. 15, 2011

(54) MOLECULAR SIEVE SSZ-79

(75) Inventor: Allen Burton, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 12/872,259

(22) Filed: Aug. 31, 2010

(65) Prior Publication Data

US 2010/0322848 A1    Dec. 23, 2010

Related U.S. Application Data

(63) Continuation of application No. 12/361,387, filed on Jan. 28, 2009.

(51) Int. Cl.
  C01B 39/04    (2006.01)
  C01B 39/46    (2006.01)
  C01B 39/48    (2006.01)

(52) U.S. Cl. .................... 423/718; 423/706

(58) Field of Classification Search .......... 423/706, 423/718
  See application file for complete search history.

(56) References Cited

U.S. PATENT DOCUMENTS

| | | | | |
|---|---|---|---|---|
| 5,098,686 | A * | 3/1992 | Delprato et al. | 423/702 |
| 5,393,511 | A * | 2/1995 | Delprato et al. | 423/718 |
| 5,707,601 | A * | 1/1998 | Nakagawa | 423/701 |
| 6,350,428 | B1 * | 2/2002 | Verduijn et al. | 423/702 |
| 2005/0136000 | A1 * | 6/2005 | Burton et al. | 423/718 |

OTHER PUBLICATIONS

Wright et al, "Cation-directed syntheses of novel zeolite-like . . . ", J. Chem. Soc., Dalton Trans., (Mar. 2000) pp. 1243-1248.*

* cited by examiner

*Primary Examiner* — David M Brunsman
(74) *Attorney, Agent, or Firm* — Michael D. Ross

(57) ABSTRACT

The present invention is directed to a new crystalline molecular sieve designated SSZ-79 synthesized using 1,8-dimethyl-1,4,8,11-tetraazacyclotetradecane or 1,4,8,11-tetramethyl-1,4,8,11-tetraazacyclotetradecane as a structure directing agent.

20 Claims, 9 Drawing Sheets

MOLECULAR SIEVE SSZ-79

FIELD OF THE INVENTION

The present invention relates to new crystalline molecular sieve SSZ-79 synthesized using 1,8-dimethyl-1,4,8,11-tetraazacyclotetradecane or 1,4,8,11-tetramethyl-1,4,8,11-tetraazacyclotetradecane as a structure directing agent ("SDA"), and uses for SSZ-79.

BACKGROUND OF THE INVENTION

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new molecular sieves with desirable properties for gas separation and drying, hydrocarbon and chemical conversions, and other applications. New molecular sieves may contain novel internal pore architectures, providing enhanced selectivities in these processes.

SUMMARY OF THE INVENTION

The present invention is directed to a new crystalline molecular sieve with unique properties, referred to herein as "molecular sieve SSZ-79" or simply "SSZ-79."

In accordance with the present invention there is provided a molecular sieve having a mole ratio greater than about 40 of (1) at least one oxide of at least one tetravalent element to (2) optionally, one or more oxides selected from the group consisting of oxides of trivalent elements, pentavalent elements, and mixtures thereof, and having, as synthesized, the powder X-ray diffraction (XRD) lines of Table 5. It should be noted that the phrase "mole ratio greater than about 40" includes the case where there is no oxide (2), i.e., the mole ratio of oxide (1) to oxide (2) is infinity. In that case the molecular sieve is comprised of essentially all of the oxide of one or more tetravalent element(s) (e.g. all Si and/or Ge).

The present invention also includes a method of preparing a molecular sieve by contacting under crystallization conditions (1) at least one source of at least one oxide of a tetravalent element; (2) optionally, one or more sources of one or more oxides selected from the group consisting of oxides of trivalent elements, pentavalent elements, and mixtures thereof; (3) optionally, fluoride ions; and (4) 1,8-dimethyl-1, 4,8,11-tetraazacyclotetradecane or 1,4,8,11-tetramethyl-1,4, 8,11-tetraazacyclotetradecane as a SDA.

The present invention also includes a process for preparing a crystalline material having, as-synthesized, the powder XRD lines of Table 5, by:

(a) preparing a reaction mixture containing (1) at least one source of at least one oxide of a tetravalent element; (2) optionally, one or more sources of one or more oxides selected from the group consisting of oxides of trivalent elements, pentavalent elements, and mixtures thereof; (3) optionally, fluoride ions; (4) one of the following SDAs:

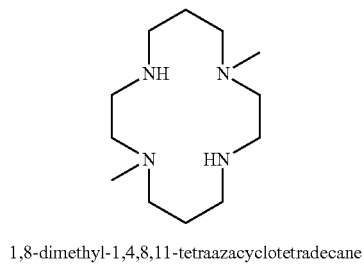

1,8-dimethyl-1,4,8,11-tetraazacyclotetradecane

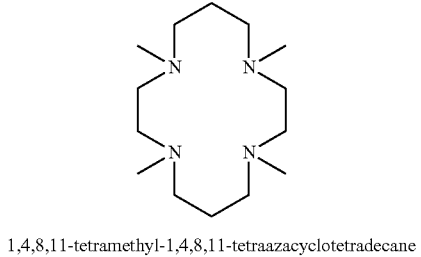

1,4,8,11-tetramethyl-1,4,8,11-tetraazacyclotetradecane and (5) water; and (b) maintaining the reaction mixture under conditions sufficient to form crystals of the molecular sieve.

Where the molecular sieve formed is an intermediate material, the process of the present invention includes a further post-crystallization processing in order to achieve the target molecular sieve (e.g. by post-synthesis heteroatom lattice substitution or acid leaching).

The present invention also provides SSZ-79 having a composition, as-synthesized and in the anhydrous state, in terms of mole ratios, as follows:

|  | Broadest | Preferred |
|---|---|---|
| $YO_2/W_2O_b$ | 40-∞ | 60-∞ |
| $Q/YO_2$ | 0.03-0.10 | 0.04-0.06 | wherein:
(1) Y is selected from the group consisting of tetravalent elements from Groups 4-14 of the Periodic Table, and mixtures thereof;
(2) W is selected from the group consisting of trivalent and pentavalent elements from Groups 3-13 of the Periodic Table, and mixtures thereof;
(3) stoichiometric variable b equals the valence state of compositional variable W (e.g. when W is trivalent, b = 3; when W is pentavalent, b = 5);
(4) Q is a SDA selected from the group consisting of 1,8-dimethyl-1,4,8,11-tetraazacyclotetradecane and 1,4,8,11-tetramethyl-1,4,8,11-tetraazacyclotetradecane.

DETAILED DESCRIPTION OF THE INVENTION

Introduction

Figure 1:
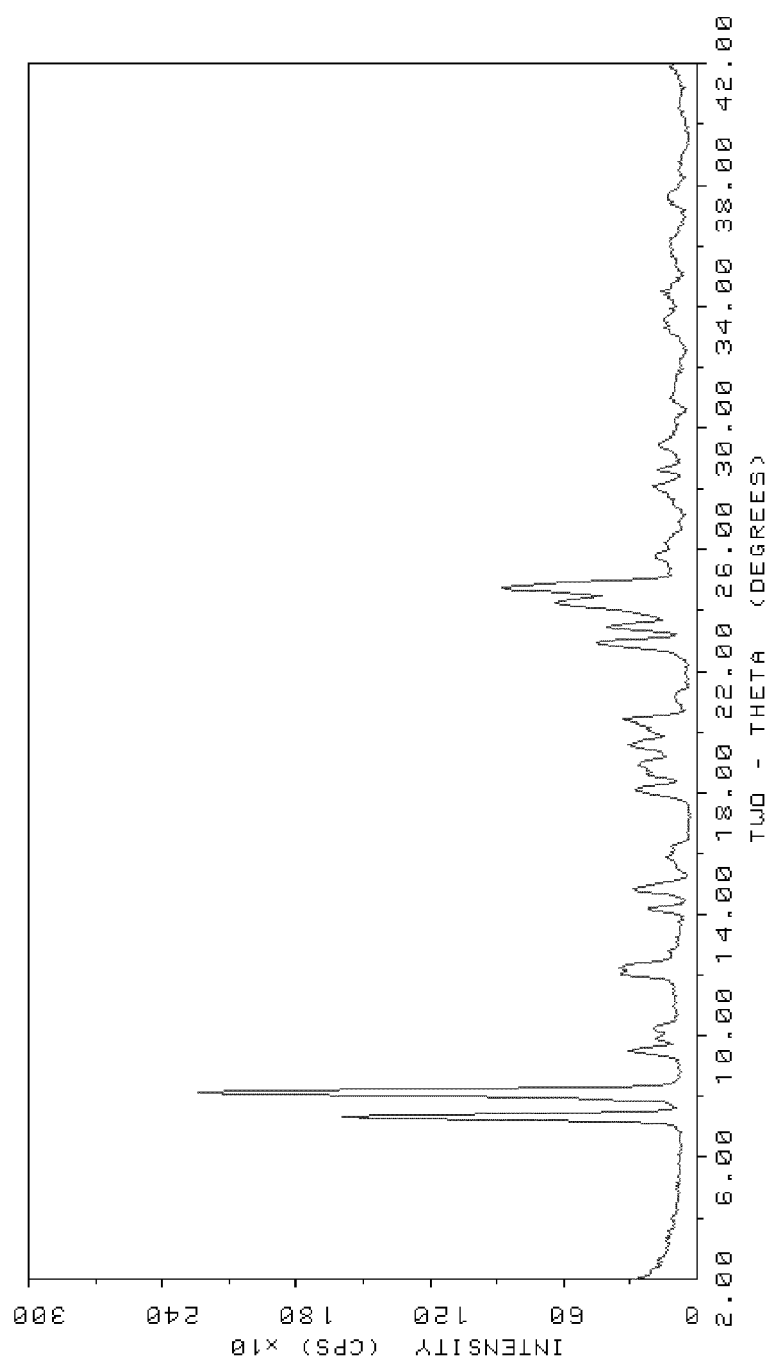
FIG. 1 shows the results of a powder XRD analysis of the molecular sieve prepared in Example 1.

The term "active source" means a reagent or precursor material capable of supplying an element in a form that can react and be incorporated into the molecular sieve structure. The terms "source" and "active source" are used interchangeably herein.

The term "Periodic Table" refers to the version of IUPAC Periodic Table of the Elements dated Jun. 22, 2007, and the numbering scheme for the Periodic Table Groups is as described in Chemical and Engineering News, 63 (5), 27 (1985).

The term "molecular sieve" includes (a) intermediate and (b) final or target molecular sieves and zeolites produced by (1) direct synthesis or (2) post-crystallization treatment (secondary synthesis). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433 to C. Y. Chen and Stacey Zones, issued Sep. 14, 2004.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants, are intended to be non-limiting, such that recitation of items in a list is not to the exclusion of other like items that may also be useful in the materials, compositions and methods of this invention.

The present invention is directed to a molecular sieve designated herein as "molecular sieve SSZ-79" or simply "SSZ-79."

In preparing SSZ-79, 1,8-dimethyl-1,4,8,11-tetraazacyclotetradecane or 1,4,8,11-tetramethyl-1,4,8,11-tetraazacyclotetradecane is used as a structure directing agent ("SDA"), also known as a crystallization template. The SDAs useful for making SSZ-79 are represented by the following structures (1) and (2).

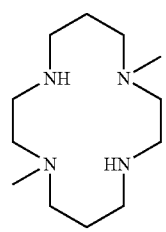

1,8-dimethyl-1,4,8,11-tetraazacyclotetradecane

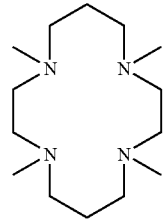

1,4,8,11-tetramethyl-1,4,8,11-tetraazacyclotetradecane

Reaction Mixture

In general, SSZ-79 is prepared by:

(a) preparing a reaction mixture containing (1) at least one source of an oxide of at least one tetravalent element; (2) optionally, one or more sources of one or more oxides selected from the group consisting of oxides of trivalent elements, pentavalent elements, and mixtures thereof; (3) optionally, fluoride ions; (4) 1,8-dimethyl-1,4,8,11-tetraazacyclotetradecane or 1,4,8,11-tetramethyl-1,4,8,11-tetraazacyclotetradecane as a SDA; and (5) water; and (b) maintaining the reaction mixture under conditions sufficient to form crystals of the molecular sieve.

Where the molecular sieve formed is an intermediate material, the process of the present invention includes a further step of synthesizing a target molecular sieve by post-synthesis techniques, such as heteroatom lattice substitution techniques and acid leaching.

The composition of the reaction mixture from which the molecular sieve is formed, in terms of molar ratios, is identified in Table 1 below:

TABLE 1

| Reactants | Broad | Preferred |
|---|---|---|
| $YO_2/W_2O_a$ molar ratio | 30-∞ | 60-∞ |
| $Q/YO_2$ molar ratio | 0.1-1.0 | 0.15-0.25 |
| $F/YO_2$ molar ratio | 0-1.0 | 0.3-0.6 |
| $H_2O/YO_2$ molar ratio | 1-40 | 3-20 | wherein:
(a) compositional variables Y, W and Q are as described herein above; and
(b) stoichiometric variable a equals the valence state of compositional variable W (e.g., when W is trivalent, a = 3; when W is pentavalent, a = 5).

In a subembodiment, the composition of the reaction mixture from which SSZ-79 is formed, in terms of molar ratios, is identified in Table 2 below, wherein composition variable Q is as described herein above.

TABLE 2

| Reactants | Broad | Preferred |
|---|---|---|
| $SiO_2/GeO_2$ molar ratio | 1-10 | 3-7 |
| $Q/(GeO_2 + SiO_2)$ molar ratio | 0.1-1.0 | 0.15-0.25 |
| $F/(GeO_2 + SiO_2)$ molar ratio | 0-1.0 | 0.3-0.6 |
| $H_2O/(GeO_2 + SiO_2)$ molar ratio | 1-40 | 3-20 |

As noted above, for each embodiment described herein, Y is selected from the group consisting of elements from Groups 4-14 of the Periodic Table. In one subembodiment, Y is selected from the group consisting of germanium (Ge), silicon (Si), titanium (Ti), and mixtures thereof. In another subembodiment, Y is selected from the group consisting of germanium (Ge), silicon (Si), and mixtures thereof. In one subembodiment, Y is Si. Sources of elements selected for composition variable Y include oxides, hydroxides, acetates, oxalates, ammonium salts and sulfates of the element(s) selected for Y and W. In one subembodiment, each active source(s) of the element(s) selected for composition variable Y is an oxide. Where Y is Si, sources useful herein for Si include fumed silica, precipitated silicates, silica hydrogel, silicic acid, colloidal silica, tetra-alkyl orthosilicates (e.g. tetraethyl orthosilicate), and silica hydroxides. Sources useful herein for Ge include germanium oxide and germanium ethoxide.

For each embodiment described herein, W is selected from the group consisting of elements from Groups 3-13 of the Periodic Table. In one subembodiment, W is selected from the group consisting of gallium (Ga), aluminum (Al), iron (Fe), boron (B), indium (In), and mixtures thereof. In another subembodiment, W is selected from the group consisting of Al, B, Fe, Ga, and mixtures thereof. Sources of elements selected for optional composition variable W include oxides, hydroxides, acetates, oxalates, ammonium salts and sulfates of the element(s) selected for W. Typical sources of aluminum oxide include aluminates, alumina, and aluminum compounds such as $AlCl_3$, $Al_2(SO_4)_3$, aluminum hydroxide ($Al(OH)_3$), kaolin clays, and other zeolites. An example of the source of aluminum oxide is LZ-210 zeolite (a type of Y zeolite). Boron, gallium, and iron can be added in forms corresponding to their aluminum and silicon counterparts.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein may vary with the nature of the reaction mixture and the crystallization conditions.

Crystallization and Post-Synthesis Treatment

In practice, the molecular sieve is prepared by:
(a) preparing a reaction mixture as described herein above; and
(b) maintaining the reaction mixture under crystallization conditions sufficient to form crystals of the molecular sieve.

The reaction mixture is maintained at an elevated temperature until the molecular sieve is formed. The hydrothermal crystallization is usually conducted under pressure, and usually in an autoclave so that the reaction mixture is subject to autogenous pressure, at a temperature between 125° C. and 200° C.

The reaction mixture may be subjected to mild stirring or agitation during the crystallization step. It will be understood by a person skilled in the art that the molecular sieves described herein may contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source for compositional variable Y used in the reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the molecular sieve. The SDA can also be removed by photolysis techniques (e.g. exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327 to Navrotsky and Parikh, issued Nov. 1, 2005.

The molecular sieve can subsequently be calcined in steam, air or inert gas at temperatures ranging from about 200° C. to about 800° C. for periods of time ranging from 1 to 48 hours, or more. Usually, it is desirable to remove the extra-framework cation (e.g. $H^+$) by ion-exchange or other known method and replace it with hydrogen, ammonium, or any desired metal-ion.

Where the molecular sieve formed is an intermediate material, the target molecular sieve can be achieved using post-synthesis techniques such as heteroatom lattice substitution techniques. The target molecular sieve (e.g. silicate SSZ-79) can also be achieved by removing heteroatoms from the lattice by known techniques such as acid leaching.

The molecular sieve made from the process of the present invention can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or, dried or partially dried and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa.

SSZ-79 is useful in catalysts for a variety of hydrocarbon conversion reactions such as hydrocracking, dewaxing, olefin isomerization, alkylation of aromatic compounds and the like. SSZ-79 is also useful as an adsorbent for gas separations.

Characterization of the Molecular Sieve

Molecular sieves made by the process of the present invention have a composition, as-synthesized and in the anhydrous state, as described in Table 3 (in terms of mole ratios), wherein compositional variables Y, W and Q and stoichiometric variables c and d are as described herein above:

TABLE 3

|  | Broadest | Preferred |
|---|---|---|
| $YO_2/W_2O_b$ | 40-∞ | 60-∞ |
| $Q/YO_2$ | 0.03-0.10 | 0.04-0.06 |

In one subembodiment, the molecular sieves made by the process of the present invention have a composition, as-synthesized, as described in Table 4 (in terms of mole ratios), wherein Q is as described herein above:

TABLE 4

|  | Broadest | Preferred |
|---|---|---|
| $SiO_2/GeO_2$ | 1-10 | 1.5-5 |
| $Q/(GeO_2 + SiO_2)$ | 0.03-0.10 | 0.04-0.06 |

Molecular sieves synthesized by the process of the present invention are characterized by their X-ray diffraction pattern. The X-ray diffraction pattern lines of Table 5 are representative of as-synthesized SSZ-79 made in accordance with this invention. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Y/W mole ratio from sample to sample. Calcination can also cause minor shifts in the X-ray diffraction pattern. Notwithstanding these minor perturbations, the basic crystal lattice structure remains unchanged.

TABLE 5

Characteristic Peaks for As-Synthesized SSZ-79

| 2 Theta[a] | d-spacing (Angstroms) | Relative Integrated Intensity (%)[b] |
|---|---|---|
| 7.37 | 11.99 | VS |
| 8.07 | 10.94 | VS |
| 12.05 | 7.34 | M |
| 14.79 | 5.99 | M |
| 18.05 | 4.91 | M |
| 19.48 | 4.55 | M |
| 22.81 | 3.89 | VS |
| 23.45 | 3.79 | S |
| 24.15 | 3.68 | VS |
| 24.64 | 3.61 | VS |

[a]±0.20
[b]The X-ray patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

The Powder X-ray diffraction patterns presented herein were collected by standard techniques. The radiation was CuK-α radiation. The peak heights and the positions, as a function of 2θ where θ is the Bragg angle, were read from the relative intensities of the peaks, and d, the interplanar spacing in Angstroms corresponding to the recorded lines, can be calculated.

EXAMPLES

The following examples demonstrate but do not limit the present invention.

Synthesis of SSZ-79 Using 1,4,8,11-tetramethyl-1,4,8,11-tetraazacyclotetradecane Example 1

1.12 g tetraethylorthosilicate (TEOS) and 2.0 g deionized water were mixed together in a tared 23 mL Teflon liner. Then 0.42 g of 1,4,8,11-tetramethyl-1,4,8,11-tetraazacyclotetradecane (Strem Chemicals) was dissolved in the solution. The ethanol (formed from the hydrolysis of the TEOS) and water were allowed to evaporate within a vented hood with flowing air over the course of two to three days. The extent of evaporation was monitored by measuring the weight of the liner and its contents. Then 0.13 g 50% HF was added and thoroughly mixed with the dried gel to create a uniform paste. Next 0.12 g germanium oxide was mixed into the gel and sufficient water was added and mixed into the gel to bring the molar ratio $H_2O/(Si+Ge)$ to 10.0. The liner was then capped and placed within a Parr Steel autoclave reactor. The autoclave was then fixed in a rotating spit within an oven heated at 150° C. for 7 days. The solid products were recovered from the cooled reactor by vacuum filtration and washed with copious quantities of water.

Figure 2:
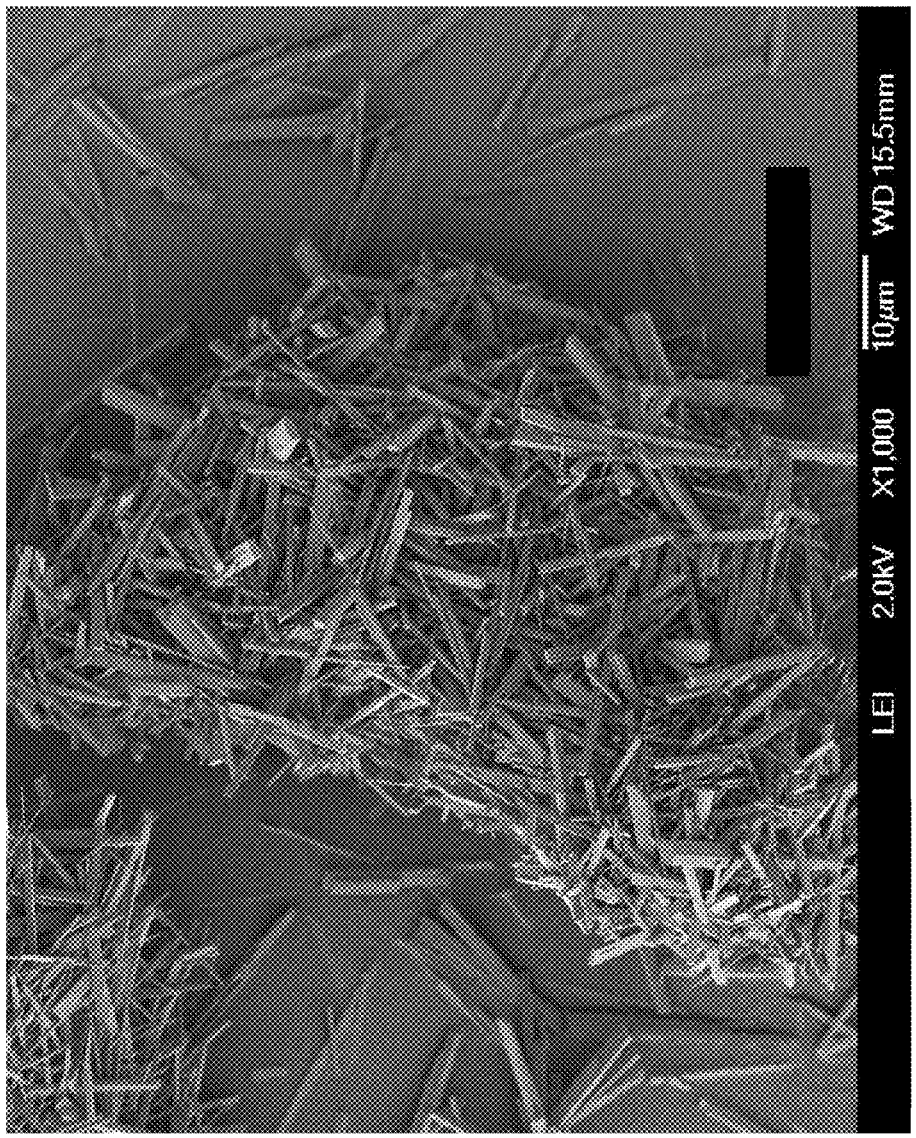
FIG. 2 shows the results of a scanning electron microscopy (SEM) analysis of the molecular sieve prepared in Example 1.
Figure 3:
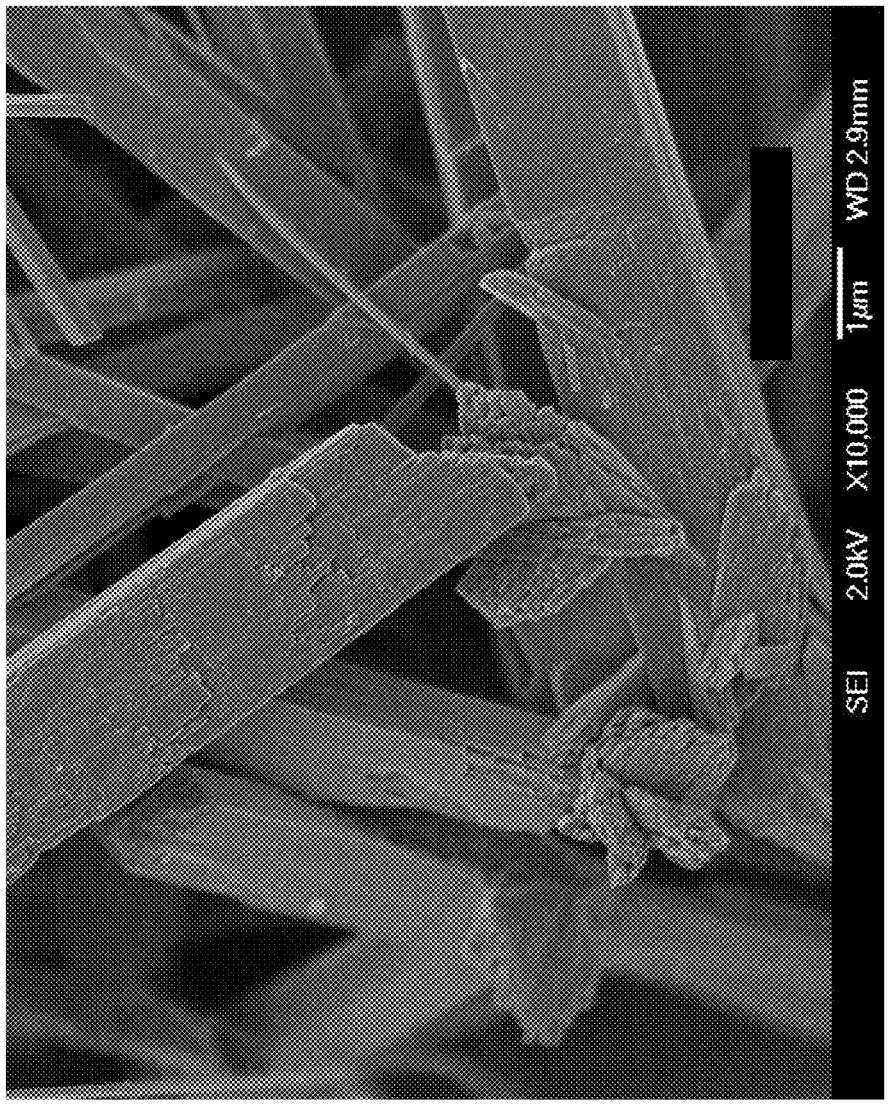
FIG. 3 also shows the results of a SEM analysis of the molecular sieve prepared in Example 1.

The resulting molecular sieve product was analyzed by powder XRD and SEM. The resulting XRD pattern is shown in FIG. 1 and indicated the material possesses a unique structure. The SEM images are shown in FIGS. 2 and 3 and indicated a uniform field of crystals. CHN combustion analyses of the as-made product showed 9.86% carbon, 3.11% nitrogen, and 1.96% hydrogen.

Example 2

The procedure from Example 1 was repeated except the reaction was allowed to proceed for 14 days rather than 7 days. The resulting product was analyzed by powder XRD, which indicated the material to be pure SSZ-79.

Example 3

Figure 4:
FIG. 4 shows the results of a SEM analysis of the molecular sieve prepared in Example 3.
Figure 5:
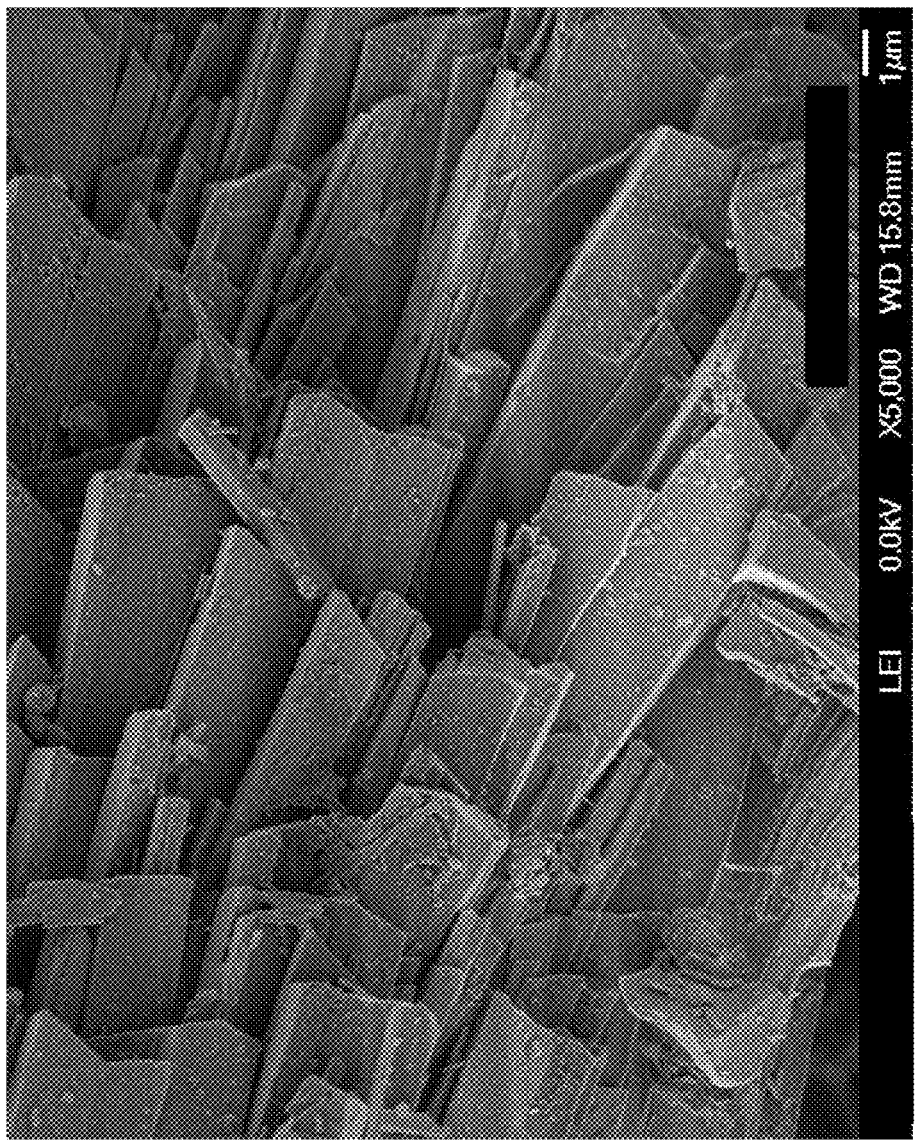
FIG. 5 also shows the results of a SEM analysis of the molecular sieve prepared in Example 3.

The procedure from Example 1 was repeated except the reaction was heated at 160° C. rather than 150° C. The resulting product was analyzed by powder XRD and SEM. Powder XRD indicated the material to be pure SSZ-79. The SEM images are shown in FIGS. 4 and 5 and show that the crystals are larger and more intergrown than the product from Example 1. Table 6 below shows the powder X-ray diffraction lines for the product.

TABLE 6

| 2 Theta[a] | d-spacing (Angstroms) | Relative Integrated Intensity (%) |
|---|---|---|
| 7.37 | 11.99 | 100 |
| 8.07 | 10.94 | 95 |
| 9.44 | 9.36 | 16 |
| 9.95 | 8.89 | 9 |
| 10.20 | 8.67 | 17 |
| 12.05 | 7.34 | 22 |
| 12.23 | 7.23 | 6 |
| 14.21 | 6.23 | 11 |
| 14.79 | 5.99 | 36 |
| 15.52 | 5.71 | 16 |
| 15.91 | 5.57 | 9 |
| 18.05 | 4.91 | 29 |
| 18.56 | 4.78 | 19 |
| 18.86 | 4.70 | 34 |
| 19.48 | 4.55 | 24 |
| 20.00 | 4.44 | 26 |

TABLE 6-continued

| 2 Theta[a] | d-spacing (Angstroms) | Relative Integrated Intensity (%) |
|---|---|---|
| 20.40 | 4.35 | 14 |
| 20.75 | 4.28 | 5 |
| 21.06 | 4.21 | 6 |
| 22.81 | 3.89 | 89 |
| 23.45 | 3.79 | 51 |
| 23.83 | 3.73 | 31 |
| 24.15 | 3.68 | 88 |
| 24.64 | 3.61 | 92 |
| 25.11 | 3.54 | 12 |
| 25.50 | 3.49 | 16 |
| 26.10 | 3.41 | 18 |
| 26.43 | 3.37 | 27 |
| 27.26 | 3.27 | 8 |
| 27.57 | 3.23 | 13 |
| 28.01 | 3.18 | 12 |
| 28.52 | 3.13 | 17 |
| 29.34 | 3.04 | 12 |
| 29.77 | 3.00 | 13 |
| 30.01 | 2.98 | 2 |
| 30.14 | 2.96 | 3 |
| 30.82 | 2.90 | 17 |

[a] ±0.20

Example 4

Figure 6:
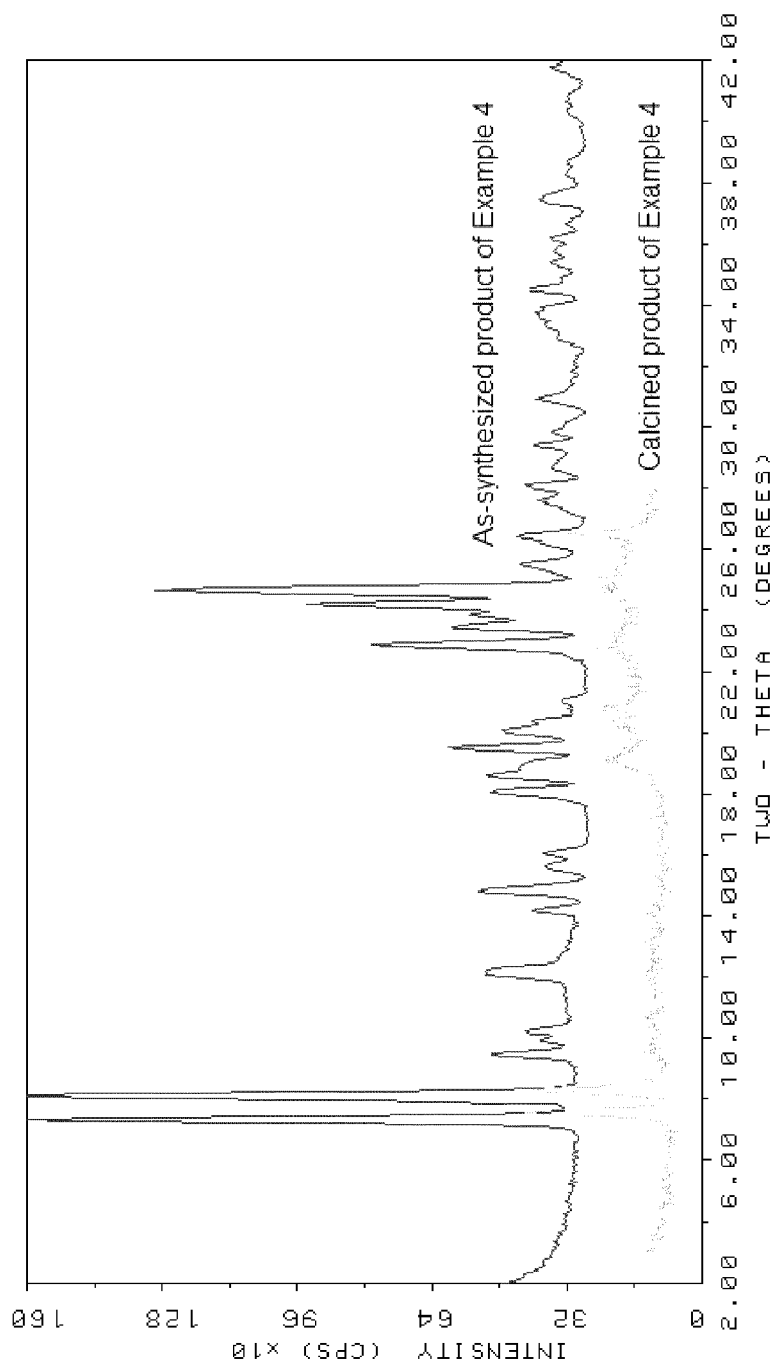
FIG. 6 shows the results of a powder XRD analysis of the as-synthesized and calcined molecular sieve prepared in Example 4.

Example 1 was repeated except germanium ethoxide was used as the germanium source rather than germanium oxide. The germanium source was added together with the TEOS in the beginning of the procedure rather than adding the germanium source at the end. Also, the final $H_2O/(Si+Ge)$ was adjusted to 14.0 rather than 10.0. The resulting product was analyzed by powder XRD. The resulting XRD pattern is shown in FIG. 6 which indicated the material was pure SSZ-79.

The resulting product was calcined inside a muffle furnace under a flow of 2% oxygen/98% nitrogen heated to 550° C. at a rate of 1° C./min and held at 550° C. for five hours and then analyzed by powder XRD. The resulting XRD pattern is shown in FIG. 6.

Example 5

0.42 g of 1,4,8,11-tetramethyl-1,4,8,11-tetraazacyclotetradecane (Strem Chemicals) was dissolved in 1.00 g deionized water. 0.056 g germanium oxide was then dissolved in the solution. Next 0.33 g CAB-O-SIL M-5 fumed silica (Cabot Corporation) was added to the solution and mixed to create a uniform paste. Then 0.13 g 50% HF was added and thoroughly mixed with the dried gel to create a uniform paste. Sufficient water was added and mixed into the gel to bring the molar ratio $H_2O/(Si+Ge)$ to 10. The liner was then capped and placed within a Parr Steel autoclave reactor. The autoclave was then fixed in a rotating spit within an oven heated at 160° C. for 7 days. The solid products were recovered from the cooled reactor by vacuum filtration and washed with copious quantities of water. The resulting product was analyzed by powder XRD, which indicated the product was CLS-5 with minor SSZ-79.

Example 6

0.42 g of 1,4,8,11-tetramethyl-1,4,8,11-tetraazacyclotetradecane (Strem Chemicals) was dissolved in 1.00 g deionized water. 0.11 g germanium oxide was then dissolved in the solution. Next 0.32 g CAB-O-SIL M-5 fumed silica (Cabot Corporation) was added to the solution and mixed to create a uniform paste. Then 0.13 g 50% HF was added and thoroughly mixed with the dried gel to create a uniform paste. Sufficient water was added and mixed into the gel to bring the molar ratio H2O/(Si+Ge) to 10. The liner was then capped and placed within a Parr Steel autoclave reactor. The autoclave was then fixed in a rotating spit within an oven heated at 160° C. for 12 days. The solid products were recovered from the cooled reactor by vacuum filtration and washed with copious quantities of water. The resulting product was analyzed by powder XRD, which indicated the product was a mixture of SSZ-79 and CLS-5.

Example 7

1.21 g tetraethylorthosilicate, 2.0 g deionized water, and 0.16 g germanium ethoxide were mixed together in a tared 23 mL Teflon liner. Then 0.42 g of 1,4,8,11-tetramethyl-1,4,8,11-tetraazacyclotetradecane (Strem Chemicals) was dissolved in the mixture. The ethanol (formed from the hydrolysis of the TEOS) and water were allowed to evaporate within a vented hood with flowing air over the course of 3-4 days. Then 0.13 g 50% HF was added and thoroughly mixed with the dried gel to create a uniform paste. Sufficient water was added and mixed into the gel to bring the molar ratio $H_2O/(Si+Ge)$ to 10. The liner was then capped and placed within a Parr Steel autoclave reactor. The autoclave was then fixed in a rotating spit within an oven heated at 160° C. for 7 days. The solid products were recovered from the cooled reactor by vacuum filtration and washed with copious quantities of water. The resulting product was analyzed by powder XRD, which indicated that the product was CLS-5.

Example 8

1.21 g tetraethylorthosilicate, 2.0 g deionized water, and 0.27 g germanium ethoxide were mixed together in a tared 23 mL Teflon liner. Then 0.42 g of 1,4,8,11-tetramethyl-1,4,8,11-tetraazacyclotetradecane (Strem Chemicals) was dissolved in the mixture. The ethanol (formed from the hydrolysis of the TEOS) and water were allowed to evaporate within a vented hood with flowing air over the course of 3-4 days. Then 0.13 g 50% HF was added and thoroughly mixed with the dried gel to create a uniform paste. Sufficient water was added and mixed into the gel to bring the molar ratio H2O/(Si+Ge) to 3.5. The liner was then capped and placed within a Parr Steel autoclave reactor. The autoclave was then fixed in a rotating spit within an oven heated at 170° C. for 8 days. The solid products were recovered from the cooled reactor by vacuum filtration and washed with copious quantities of water.

The resulting zeolite product was analyzed by powder XRD, which indicated that the product was a mixture of a dense germanate and a novel germanosilicate that we designate "SSZ-80."

Example 9

Example 8 was repeated except that the final $H_2O/(Si+Ge)$ was adjusted to 10 rather than 3.5 and the reaction was heated at 150° C. rather than 170° C. The resulting product was analyzed by powder XRD, which indicated that the product was a mixture of SSZ-79 and SSZ-80.

Example 10

Example 9 was repeated except that 0.01 g F-2000 aluminum hydroxide (Reheis, Inc.) was added to the synthesis gel.

The resulting product was analyzed by powder XRD, which indicated that the product was a mixture of SSZ-79 and SSZ-80.

Example 11

1.01 g tetraethylorthosilicate, 2.0 g deionized water, and 0.41 g germanium ethoxide were mixed together in a tared 23 mL Teflon liner. Then 0.42 g of 1,4,8,11-tetramethyl-1,4,8,11-tetraazacyclotetradecane (Strem Chemicals) was dissolved in the mixture. The Teflon container was then capped, sealed, and placed within an 23-mL steel Parr autoclave. The autoclave was allowed to remain at room temperature for 2 days during which time the TEOS and germanium ethoxide were allowed to hydrolyze. The Teflon cup was then removed from the autoclave and 0.13 g 50% HF was added and mixed to create a white viscous gel. The ethanol (formed from the hydrolysis of the TEOS and germanium oxide) and water were allowed to evaporate within a vented hood with flowing air over the course of 3-4 days. Sufficient water was added and mixed into the gel to bring the molar ratio $H_2O/(Si+Ge)$ to 7. The liner was then capped and placed within a Parr Steel autoclave reactor. The autoclave was then fixed in a rotating spit within an oven heated at 160° C. for 10 days. The solid products were recovered from the cooled reactor by vacuum filtration and washed with copious quantities of water.

Figure 7:
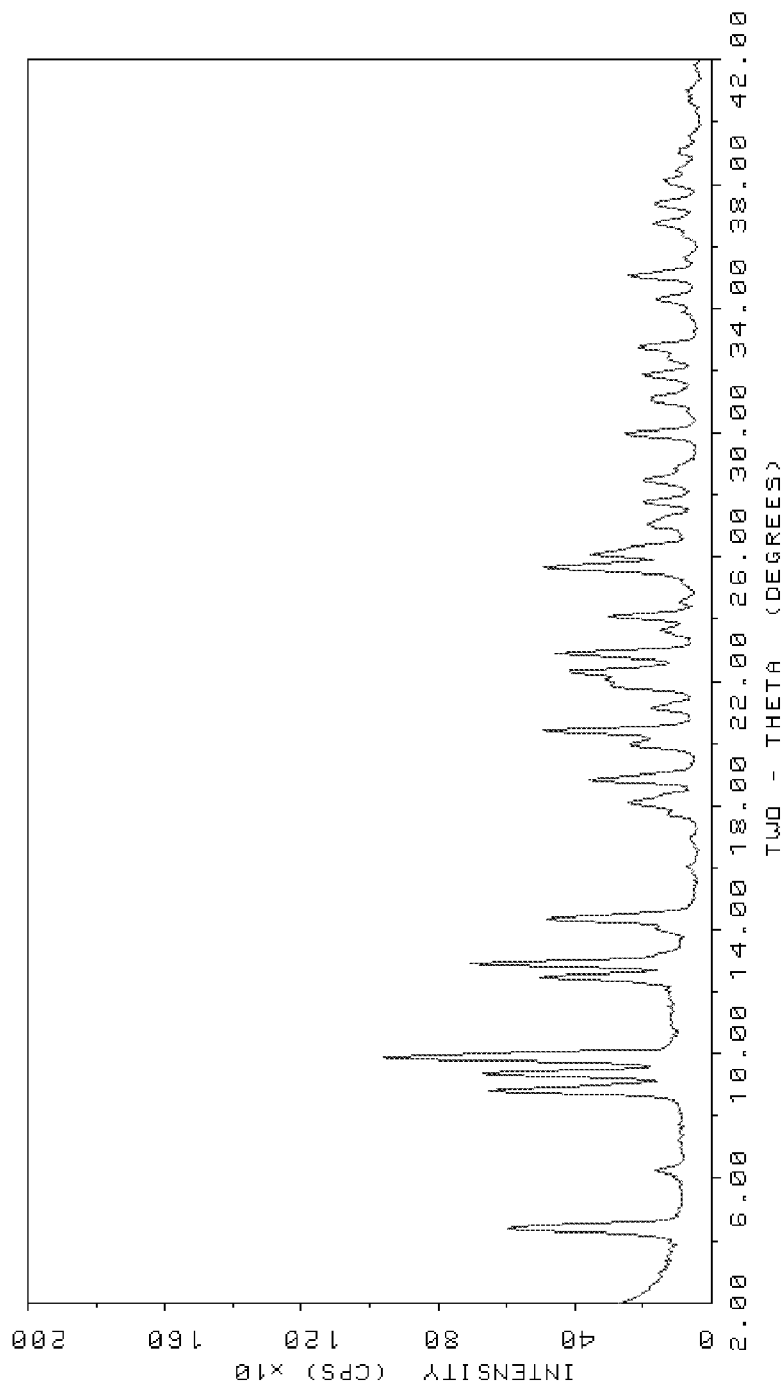
FIG. 7 shows the results of a powder XRD analysis of the as-synthesized and calcined molecular sieve prepared in Example 11.

The resulting molecular sieve product was analyzed by powder XRD. The resulting XRD pattern is shown in FIG. 7 and indicated that the product was pure SSZ-80.

Example 12

1.35 g tetraethylorthosilicate and 2.0 g deionized water were mixed together in a tared 23 mL Teflon liner. Then 0.42 g of 1,4,8,11-tetramethyl-1,4,8,11-tetraazacyclotetradecane (Strem Chemicals) was dissolved in the solution. The ethanol (formed from the hydrolysis of the TEOS) and water were allowed to evaporate within a vented hood with flowing air over the course of 3-4 days. The extent of evaporation was monitored by measuring the weight of the liner and its contents. Then 0.13 g 50% HF was added and thoroughly mixed with the dried gel to create a uniform paste. Sufficient water was added and mixed into the gel to bring the molar ratio $H_2O/Si$ to 3.5. The liner was then capped and placed within a Parr Steel autoclave reactor. The autoclave was then fixed in a rotating spit within an oven heated at 150° C. for 8 days. The solid products were recovered from the cooled reactor by vacuum filtration and washed with copious quantities of water.

The resulting zeolite product was analyzed by powder XRD, which indicated that the material was a unique layered silicate that we designate CLS-5 (Chevron Layered Silicate 5).

Example 13

The procedure from Example 12 was repeated except that the final $H_2O/Si$ was adjusted to 7.0 rather than 3.5. The resulting zeolite product was analyzed by powder XRD, which indicated the product was CLS-5.

Example 14

2.24 g tetraethylorthosilicate (TEOS) and 3.0 g deionized water were mixed together in a tared 23 mL Teflon liner. Then 0.84 g of 1,4,8,11-tetramethyl-1,4,8,11-tetraazacyclotetradecane (Strem Chemicals) was dissolved in the suspension. Next 0.54 g germanium ethoxide was mixed into the gel until the suspension was clear. Finally, 0.025 g F-2000 aluminum hydroxide (Reheis, Inc.) was mixed into the gel. The ethanol (formed from the hydrolysis of the TEOS) and water were allowed to evaporate within a vented hood with flowing air over the course of two to three days. The extent of evaporation was monitored by measuring the weight of the liner and its contents. Then 0.26 g 50% HF was added and thoroughly mixed with the dried gel to create a uniform paste. Deionized water was mixed into the gel to bring the molar ratio $H_2O/(Si+Ge)$ to 10.0. The liner was then capped and placed within a Parr Steel autoclave reactor. The autoclave was then fixed in a rotating spit within an oven heated at 160° C. for 8 days.

The resulting product was analyzed by powder XRD, which indicated the product to be pure SSZ-79. ICP analysis indicated a Si/Ge ratio of 1.7 and an (Si+Ge)/Al ratio of 125.

The product from was then calcined inside a muffle furnace under a flow of 2% oxygen/98% nitrogen heated to 595° C. at a rate of 1° C./min and held at 595° C. for five hours. The calcination was done in a nitrogen atmosphere with a slight bleed of air. Nitrogen adsorption measurements were then performed with an ASAP 2010 to determine the micropore volume by the t-plot method. The measured micropore volume was 0.17 cc/g.

Synthesis of SSZ-79 Using
1,8-dimethyl-1,4,8,11-tetraazacyclotetradecane

Example 15

1.12 g tetraethylorthosilicate (TEOS) and 2.0 g deionized water were mixed together in a tared 23-mL Teflon liner. Then 0.37 g 1,8-dimethyl-1,4,8,11-tetraazacyclotetradecane (Sigma-Aldrich) of was dissolved in the suspension. 0.27 g germanium ethoxide was mixed into the gel and stirred until the suspension became clear. The ethanol (formed from the hydrolysis of the TEOS) and water were allowed to evaporate within a vented hood with flowing air over the course of two to three days. The extent of evaporation was monitored by measuring the weight of the liner and its contents. Then 0.13 g 50% HF was added and thoroughly mixed with the dried gel to create a uniform paste. Deionized water was mixed into the gel to bring the molar ratio $H_2O/(Si+Ge)$ to 10.0. The liner was then capped and placed within a Parr Steel autoclave reactor. The autoclave was then fixed in a rotating spit within an oven heated at 150° C. for 11 days. The solid products were recovered from the cooled reactor by vacuum filtration and washed with copious quantities of water.

Figure 8:
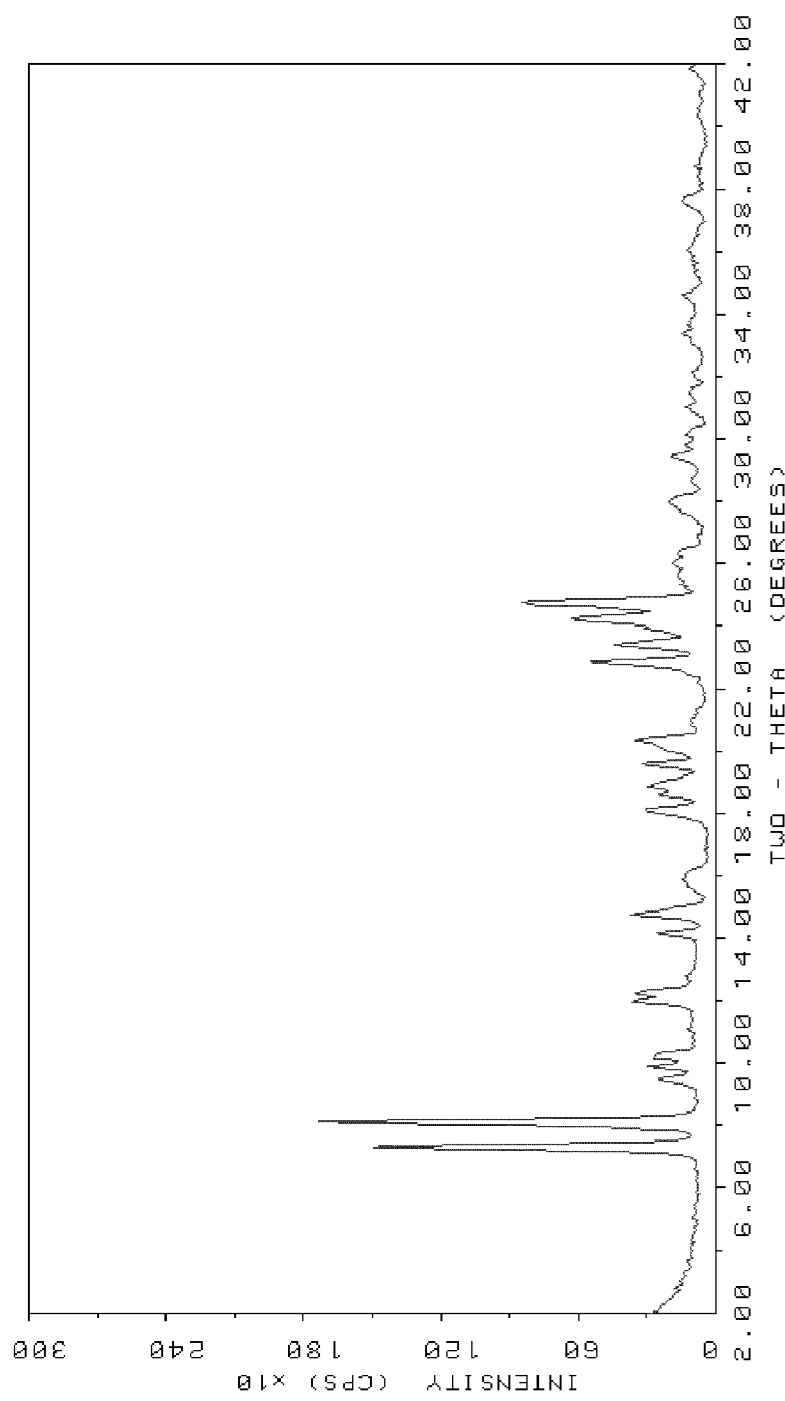
FIG. 8 shows the results of a powder XRD analysis of the zeolite prepared in Example 15.

The resulting product was analyzed by powder XRD. The resulting XRD pattern is shown in FIG. 8 and indicated the product to be pure SSZ-79.

Example 16

1.01 g tetraethylorthosilicate, 2.0 g deionized water, and 0.41 g germanium ethoxide were mixed together in a tared 23 mL Teflon liner. Then 0.37 g of 1,8-dimethyl-1,4,8,11-tetraazacyclotetradecane (Sigma-Aldrich) was dissolved in the mixture. The Teflon container was then capped, sealed, and placed within an 23-mL steel Parr autoclave. The autoclave was allowed to remain at room temperature for 2 days during which time the TEOS and germanium ethoxide were allowed to hydrolyze. The Teflon cup was then removed from the autoclave and 0.13 g 50% HF was added and mixed to create a white viscous gel. The ethanol (formed from the hydrolysis of the TEOS) and water were allowed to evaporate within a vented hood with flowing air over the course of 3-4 days.

Sufficient water was added and mixed into the gel to bring the molar ratio $H_2O/(Si+Ge)$ to 10. The liner was then capped and placed within a Parr Steel autoclave reactor. The autoclave was then fixed in a rotating spit within an oven heated at 150° C. for 11 days. The solid products were recovered from the cooled reactor by vacuum filtration and washed with copious quantities of water. The resulting product was analyzed by powder XRD, which indicated that the product was SSZ-80 with minor SSZ-79.

Example 17

1.12 g tetraethylorthosilicate, 2.0 g deionized water, and 0.27 g germanium ethoxide were mixed together in a tared 23 mL Teflon liner. Then 0.37 g of 1,8-dimethyl-1,4,8,11-tetraazacyclotetradecane (Sigma-Aldrich) was dissolved in the mixture. The Teflon container was then capped, sealed, and placed within an 23-mL steel Parr autoclave. The autoclave was allowed to remain at room temperature for 2 days during which time the TEOS and germanium ethoxide were allowed to hydrolyze. The Teflon cup was then removed from the autoclave and 0.13 g 50% HF was added and mixed to create a white viscous gel. The ethanol (formed from the hydrolysis of the TEOS) and water were allowed to evaporate within a vented hood with flowing air over the course of 3-4 days. Sufficient water was added and mixed into the gel to bring the molar ratio $H_2O/(Si+Ge)$ to 10. The liner was then capped and placed within a Parr Steel autoclave reactor. The autoclave was then fixed in a rotating spit within an oven heated at 150° C. for 7 days. A small amount of the mixture was then removed from the cooled reactor and washed with copious quantities of water.

The resulting product was analyzed by powder XRD, which indicated the product was SSZ-79 with minor SSZ-80. The Teflon container was then re-capped, sealed, placed within the Parr Steel autoclave reactor, and heated at 150° C. for an additional four days. The solid products were recovered from the cooled reactor by vacuum filtration and washed with copious quantities of water. The resulting product was analyzed by powder XRD, which indicated that the product was pure SSZ-79.

Example 18

Example 6 was repeated except that 0.37 g of 1,8-dimethyl-1,4,8,11-tetraazacyclotetradecane (Sigma-Aldrich) was used as the structure directing agent instead of 0.42 g of 1,4,8,11-tetramethyl-1,4,8,11-tetraazacyclotetradecane. The gel was heated at 160° C. for 19 days. The resulting product was analyzed by powder XRD, which indicated that the product was mostly SSZ-79 with some amorphous material.

Example 19

2.25 g of 1,8-dimethyl-1,4,8,11-tetraazacyclotetradecane (Sigma-Aldrich) was mixed with 2.00 g deionized water together in a tared 23 mL Teflon liner. 0.125 g F-2000 aluminum hydroxide (Reheis, Inc.) was dissolved in the resulting solution. 1.62 g germanium ethoxide was dissolved in the solution and 6.72 g tetraethylorthosilicate was added to the mixture. The Teflon container was then capped, sealed, and placed within an 23-mL steel Parr autoclave. The autoclave was allowed to remain at room temperature for 2 days during which time the TEOS and germanium ethoxide were allowed to hydrolyze. Then 0.78 g 50% HF was added and thoroughly mixed with the dried gel to create a uniform paste. Sufficient water was added and mixed into the gel to bring the molar ratio $H_2O/(Si+Ge)$ to 12.8. The liner was then capped and placed within a Parr Steel autoclave reactor. The autoclave was then fixed in a rotating spit within an oven heated at 160° C. for 15 days. The solid products were recovered from the cooled reactor by vacuum filtration and washed with copious quantities of water. The resulting product was analyzed by powder XRD, which indicated the product was SSZ-79 with minor amorphous material. Table 7 below shows the powder X-ray diffraction lines for the product.

TABLE 7

| 2 Theta[a] | d-spacing (Angstroms) | Relative Integrated Intensity (%) |
|---|---|---|
| 7.36 | 12.01 | 100 |
| 8.14 | 10.85 | 72 |
| 9.53 | 9.28 | 13 |
| 9.97 | 8.87 | 11 |
| 10.28 | 8.60 | 19 |
| 12.07 | 7.33 | 10 |
| 12.23 | 7.23 | 22 |
| 14.18 | 6.24 | 8 |
| 14.77 | 5.99 | 24 |
| 15.00 | 5.90 | 12 |
| 15.80 | 5.61 | 13 |
| 16.16 | 5.48 | 7 |
| 18.13 | 4.89 | 27 |
| 18.54 | 4.78 | 11 |
| 18.94 | 4.68 | 18 |
| 19.20 | 4.62 | 11 |
| 19.58 | 4.53 | 12 |
| 20.08 | 4.42 | 6 |
| 20.31 | 4.37 | 23 |
| 20.98 | 4.23 | 10 |
| 22.94 | 3.87 | 53 |
| 23.46 | 3.79 | 40 |
| 23.99 | 3.71 | 13 |
| 24.24 | 3.67 | 62 |
| 24.73 | 3.60 | 59 |
| 25.73 | 3.46 | 18 |
| 26.10 | 3.41 | 9 |
| 26.35 | 3.38 | 8 |
| 27.78 | 3.21 | 7 |
| 28.07 | 3.18 | 19 |
| 28.70 | 3.11 | 8 |
| 29.37 | 3.04 | 17 |
| 29.86 | 2.99 | 6 |
| 30.24 | 2.95 | 12 |
| 31.11 | 2.87 | 5 |
| 31.43 | 2.84 | 7 |
| 32.18 | 2.78 | 5 |

[a] ±0.20

Example 20

Example 19 was repeated except 0.25 g F-2000 aluminum hydroxide (Reheis, Inc.) was used rather than 0.125 g aluminum hydroxide. Also, the gel was first heated at 160° C. for 22 days. The reactor was then removed from the oven and an additional 1.50 g deionized water was added to the gel. The Teflon container was then re-capped, sealed, placed within the Parr Steel autoclave reactor, and heated at 160° C. for an additional 21 days. The resulting product was analyzed by powder XRD, which indicated the product was approximately 60% SSZ-79 with amorphous material.

Example 21

0.37 g of 1,8-dimethyl-1,4,8,11-tetraazacyclotetradecane was dissolved in 1.00 g deionized water. 0.27 g germanium oxide was mixed into the solution and then 1.2 g TEOS was added to the suspension. The Teflon container was then capped, sealed, and placed within an 23-mL steel Parr autoclave. The autoclave was allowed to remain at room temperature overnight during which time the TEOS was allowed to hydrolyze. The Teflon cup was then removed from the autoclave and 0.06 g 50% HF was added and mixed to create a white viscous gel. Sufficient water was added and mixed into the gel to bring the molar ratio H2O/(Si+Ge) to 10. The liner was then capped and placed within a Parr Steel autoclave reactor. The autoclave was then fixed in a rotating spit within an oven heated at 150° C. for 14 days. The solid products were recovered from the cooled reactor by vacuum filtration and washed with copious quantities of water. Powder XRD indicated the product was approximately a 70/30 mix of SSZ-79 and SSZ-80, respectively.

Example 22

Example 21 was repeated except only 0.03 g 50% HF was added rather than 0.06 g 50% HF. Powder XRD indicated the product was approximately a 20/80 mix of SSZ-79 and SSZ-80, respectively.

Example 23

1.12 g tetraethylorthosilicate (TEOS) and 2.0 g deionized water were mixed together in a tared 23-mL Teflon liner. Then 0.37 g 1,8-dimethyl-1,4,8,11-tetraazacyclotetradecane (Sigma-Aldrich) of was dissolved in the suspension. 0.12 g germanium oxide was mixed into the gel and stirred until the suspension became clear. The Teflon container was then capped, sealed, and placed within an 23-mL steel Parr autoclave. The autoclave was allowed to remain at room temperature for 2 days during which time the TEOS was allowed to hydrolyze. The Teflon cup was then removed from the autoclave, the cap was opened, and the cup was placed within a vented hood. The ethanol (formed from the hydrolysis of the TEOS) and water were allowed to evaporate within a vented hood with flowing air over the course of two to three days. The extent of evaporation was monitored by measuring the weight of the liner and its contents. Deionized water was mixed into the gel to bring the molar ratio $H_2O/(Si+Ge)$ to 10.0. The liner was then capped and placed within a Parr Steel autoclave reactor. The autoclave was then fixed in a rotating spit within an oven heated at 160° C. for 8 days. The solid products were recovered from the cooled reactor by vacuum filtration and washed with copious quantities of water.

Figure 9:
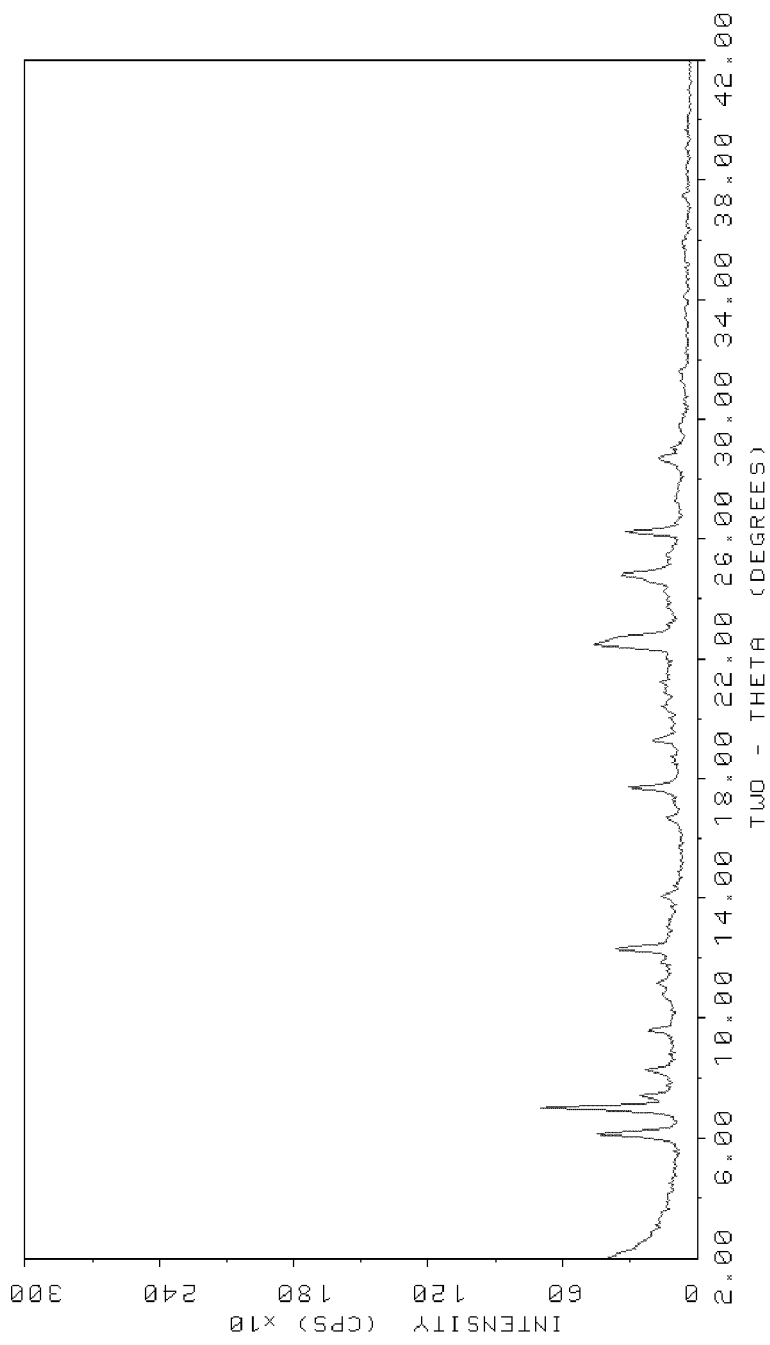
FIG. 9 shows the results of a powder XRD analysis of the zeolite prepared in Example 23.

The resulting product was analyzed by powder XRD. The resulting XRD pattern is shown in FIG. 9 and indicated the product was IM-12 (UTL).

Example 24

Example 23 was repeated at 150° C. for 16 days. The resulting product was analyzed by powder XRD, which indicated IM-12 (UTL) was again the product.

Example 25

Example 23 repeated at 150° C. for 16 days and 0.03 g 50% HF is added after the hydrolysis step. The resulting product was analyzed by powder XRD, which indicated the product was SSZ-79.

What is claimed is:

1. A molecular sieve having a mole ratio greater than about 40 of (1) at least one oxide of at least one tetravalent element to (2) one or more oxides selected from the group consisting of oxides of trivalent elements, pentavalent elements, and mixtures thereof, and having, as synthesized, an X-ray diffraction pattern substantially as shown in the following Table:

| 2 Theta | d-spacing (Angstroms) | Relative Integrated Intensity (%) |
|---|---|---|
| 7.37 ± 0.20 | 11.99 | VS |
| 8.07 ± 0.20 | 10.94 | VS |
| 12.05 ± 0.20 | 7.34 | M |
| 14.79 ± 0.20 | 5.99 | M |
| 18.05 ± 0.20 | 4.91 | M |
| 19.48 ± 0.20 | 4.55 | M |
| 22.81 ± 0.20 | 3.89 | VS |
| 23.45 ± 0.20 | 3.79 | S |
| 24.15 ± 0.20 | 3.68 | VS |
| 24.64 ± 0.20 | 3.61 | VS. |

2. The molecular sieve according to claim 1, wherein the molecular sieve has a mole ratio greater than about 40 of (1) silicon oxide to (2) an oxide selected from aluminum oxide, gallium oxide, iron oxide, boron oxide, indium oxide and mixtures thereof.

3. The molecular sieve according to claim 1, wherein the molecular sieve has a composition, as-synthesized, in terms of mole ratios, as follows:

| | |
|---|---|
| $YO_2/W_2O_b$ | 40-∞ |
| $Q/YO_2$ | 0.03-0.10 | wherein:
(1) Y is selected from the group consisting of tetravalent elements from Groups 4-14 of the Periodic Table, and mixtures thereof;
(2) W is selected from the group consisting of trivalent and pentavalent elements from Groups 3-13 of the Periodic Table, and mixtures thereof;
(3) b equals the valence state of W; and
(4) Q is a structure directing agent selected from the group consisting of 1,8-dimethyl-1,4,8,11-tetraazacyclotetradecane and 1,4,8,11-tetramethyl-1,4,8,11-tetraazacyclotetradecane.

4. The molecular sieve according to claim 3, wherein Y is selected from the group consisting of Ge, Si, and mixtures thereof.

5. The molecular sieve according to claim 4, wherein Y is Si.

6. The molecular sieve according to claim 4, wherein W is selected from the group consisting of Ga, Al, Fe, B, In, and mixtures thereof.

7. The molecular sieve according to claim 6, wherein W is selected from the group consisting of Al, B, Fe, Ga, and mixtures thereof.

8. The molecular sieve according to claim 3, wherein W is selected from the group consisting of Ga, Al, Fe, B, In, and mixtures thereof.

9. The molecular sieve according to claim 8, wherein W is selected from the group consisting of Al, B, Fe, Ga, and mixtures thereof.

10. The molecular sieve according to claim 3, wherein Y is Si and W is Al.

11. A molecular sieve having a mole ratio greater than about 40 of (1) at least one oxide of at least one tetravalent element to (2) optionally, one or more oxides selected from the group consisting of oxides of trivalent elements, pentavalent elements, and mixtures thereof, and having, as synthesized, an X-ray diffraction pattern substantially as shown in the following Table:

| 2 Theta | d-spacing (Angstroms) | Relative Integrated Intensity (%) |
| --- | --- | --- |
| 7.37 ± 0.20 | 11.99 | VS |
| 8.07 ± 0.20 | 10.94 | VS |
| 12.05 ± 0.20 | 7.34 | M |
| 14.79 ± 0.20 | 5.99 | M |
| 18.05 ± 0.20 | 4.91 | M |
| 19.48 ± 0.20 | 4.55 | M |
| 22.81 ± 0.20 | 3.89 | VS |
| 23.45 ± 0.20 | 3.79 | S |
| 24.15 ± 0.20 | 3.68 | VS |
| 24.64 ± 0.20 | 3.61 | VS | the molecular sieve made by a process comprising contacting under crystallization conditions (1) at least one source of oxide of at least one tetravalent element; (2) optionally, one or more sources of one or more oxides selected from the group consisting of oxides of trivalent elements, pentavalent elements, and mixtures thereof; (3) optionally, fluoride ions; and (4) 1,8-dimethyl-1,4,8,11-tetraazacyclotetradecane or 1,4,8,11-tetramethyl-1,4,8,11-tetraazacyclotetradecane as a structure directing agent.

12. The molecular sieve of claim 11, wherein the molecular sieve is prepared from a reaction mixture comprising, in terms of mole ratios, the following Table:

| | |
| --- | --- |
| $YO_2/W_2O_a$ | 30-∞ |
| $Q/YO_2$ | 0.1-1.0 |
| $F/YO_2$ | 0-1.0 |
| $H_2O/YO_2$ | 1-40 | wherein:
(1) Y is selected from the group consisting of tetravalent elements from Groups 4-14 of the Periodic Table, and mixtures thereof;
(2) W is selected from the group consisting of trivalent and pentavalent elements from Groups 3-13 of the Periodic Table, and mixtures thereof;
(3) a equals the valence state of W; and
(4) Q is a 1,8-dimethyl-1,4,8,11-tetraazacyclotetradecane or 1,4,8,11-tetramethyl-1,4,8,11-tetraazacyclotetradecane as a structure directing agent.

13. The molecular sieve of claim 12, wherein Y is selected from the group consisting of Ge, Si, and mixtures thereof.

14. The molecular sieve of claim 13, wherein Y is Si.

15. The molecular sieve of claim 13, wherein W is selected from the group consisting of Ga, Al, Fe, B, In, and mixtures thereof.

16. The molecular sieve of claim 15, wherein W is selected from the group consisting of Al, B, Fe, Ga, and mixtures thereof.

17. The molecular sieve of claim 12, wherein W is selected from the group consisting of Ga, Al, Fe, B, In, and mixtures thereof.

18. The molecular sieve of claim 17, wherein W is selected from the group consisting of Al, B, Fe, Ga, and mixtures thereof.

19. The molecular sieve of claim 12, wherein Y is Si and W is Al.

20. The molecular sieve of claim 11, wherein the molecular sieve has a composition, as-synthesized and in the anhydrous state, in terms of mole ratios, as follows:

| | |
| --- | --- |
| $YO_2/W_2O_b$ | 40-∞ |
| $Q/YO_2$ | 0.03-0.10 | wherein b equals the valence state of W, and Q is 1,8-dimethyl-1,4,8,11-tetraazacyclotetradecane or 1,4,8,11-tetramethyl-1,4,8,11-tetraazacyclotetradecane as a structure directing agent.

* * * * *